United States Patent [19]

Sherif

[11] Patent Number: 5,384,027
[45] Date of Patent: Jan. 24, 1995

[54] REFORMING HYDROCARBONS USING TRANSITION METAL CARBIDE CATALYST AND GASEOUS OXYGEN

[75] Inventor: Fawzy G. Sherif, Stony Point, N.Y.

[73] Assignee: Akzo Nobel N.V., Arnhem, Netherlands

[21] Appl. No.: 149,426

[22] Filed: Nov. 9, 1993

[51] Int. Cl.⁶ ............................................ C10G 35/06
[52] U.S. Cl. .................................... 208/134; 208/135; 208/136; 585/420
[58] Field of Search ........................ 208/134, 135, 136; 585/420

[56] References Cited

U.S. PATENT DOCUMENTS

| | | | |
|---|---|---|---|
| 2,661,320 | 12/1953 | Beckberger et al. | 208/136 |
| 2,661,380 | 12/1953 | Orkin | 208/134 |
| 2,661,383 | 12/1953 | Beckberger et al. | 585/420 |
| 2,718,535 | 9/1955 | McKinley et al. | 208/134 |
| 2,755,228 | 7/1956 | Anhorn et al. | 196/50 |
| 2,864,875 | 12/1958 | McKinley et al. | 208/134 |
| 4,522,708 | 6/1985 | Leclercq et al. | 208/136 |
| 5,139,987 | 8/1992 | Ledoux et al. | 502/177 |
| 5,196,389 | 3/1993 | Dubots | 502/178 |
| 5,200,060 | 4/1993 | Sajkowski et al. | 208/108 |

OTHER PUBLICATIONS

The Chemistry of Catalytic Hydrocarbon Conversions by H. Pines (Academic Press, 1981) pp. 102–105.
Iglesia et al., "Bifunctional Reactions of Alkanes on Tungsten Carbides Modified by Chemisorbed Oxygens", Journal of Catalysis, 131, pp. 523–544, (1991).
Ribeiro et al., "Reactions of Neopentane, Methylcyclohexane, and 3,3-Dimethy Pentane on Tungsten Carbides . . . ", Journal of Catalysis, 130, pp. 86–105, (1991).
Ribeiro et al., "Catalytic Reactions of n-Alkanes on $\beta$-$W_2C$ and WC . . . ", Journal of Catalysis, pp. 498–513, (1991).
Ledoux et al., "Compared Activities of Platinum and High Specific Surface Area $MB_2C$ and WC Catalysts for Reforming Reactions", Journal of Catalysis, 134, pp. 383–393 (1992).
Oyama, "Preparation and Catalytic Properties of Transition Metal Carbides and Nitrides", Catalysis Today, 15, (1992), pp. 179–200.
Pham-Hud et al., "Reactions of 2-and 3-Methyl Pentane Methylcyclo Pentane Cyclopentane, and Cyclohexane on Activated $MO_2C$", Journal of Catalysis, 143, pp. 249–261 (1993).

Primary Examiner—Helen M. S. Sneed
Assistant Examiner—Walter D. Griffin
Attorney, Agent, or Firm—Richard P. Fennelly; Louis A. Morris

[57] ABSTRACT

A process for reforming a hydrocarbon which comprises treating the hydrocarbon, while at elevated temperature, with a transition metal catalyst while in the presence of an effective amount of gaseous oxygen to improve the selectivity of the catalyst to aromatic formation and reduce the hydrogenolysis activity of the catalyst. The transition metal may be tungsten, and the transition metal catalyst may be supported on an oxidic support, optionally with a ceramic passivation layer lying between the support and the transition metal catalyst. The amount of gaseous oxygen used may be from about 50 ppm to about 5000 ppm, based upon the weight of the hydrocarbon.

12 Claims, No Drawings

REFORMING HYDROCARBONS USING TRANSITION METAL CARBIDE CATALYST AND GASEOUS OXYGEN

BACKGROUND OF THE INVENTION

The reforming of hydrocarbons boiling within gasoline range without drastically changing their carbon numbers by dehydrocyclization, isomerization, hydrogenation, and/or dehydrogenation has been heretofore accomplished by using catalysts such as platinum-alumina-combined halogen, nickel, cobalt or platinum supported on silica-alumina, and oxides (e.g., molybdenum oxide and tungsten oxide) deposited on silica-alumina. Platinum reforming catalysts, which are preferred, are susceptible to irreversible poisoning, e.g., by sulfur, so that impurities in the feedstock need to be rigorously controlled. See H. Pines, The Chemistry of Catalytic Hydrocarbon Conversions, Academic Press, New York, 1981, pp. 102–104.

An early disclosure regarding the use of carbide catalysts in the reforming of hydrocarbons is U.S. Pat. No. 2,755,228 to V. J. Anhorn et al.

It is known to use transition metal carbide catalysts in the isomerization of hydrocarbons and chemisorbed oxygen on such a catalyst has been indicated as inhibiting hydrogenolysis reactions while leading to an increase in the selectivity to isomerization (See F. H. Ribeiro et al., Journal of Catalysis 130 (1991), 86–105 and 498–513). The presence of oxygen atoms is also said to allow for methyl-shift rearrangements of reactive alkene intermediates (See E. Iglesia et al., Journal of Catalysis 131 (1991), 523–544. The typical way in which oxygen atoms are chemisorbed in such a catalyst system is by the pretreatment of the transition metal catalyst with a source of oxygen. For example, in C. Pham-Huu et al., Journal of Catalysis 143 (1993), 249–261 calcination of a carbide under an air flow at 350° C. for fourteen hours followed by a stabilization period under the reacting mixture (e.g., n-hexane/hydrogen) for six hours at the same temperature is disclosed. U.S. Pat. No. 5,139,987 to M. Ledoux et al. teaches the activation of a heavy metal carbide catalyst under an oxidizing gas stream at temperatures of from 250° C. to 450° C. while maintaining such a temperature for at least three hours followed by cooling to ambient while still under the oxidizing gas stream. More recent U.S. Pat. No. 5,196,389 to D. Dubots teaches the use of oxidation conditions for the pretreatment of the catalyst of from 300° C. to 700° C.

U.S. Pat. No. 4,522,708 to L. Leclercq et al. specifically describes a catalytic reforming process employing reforming catalysts which are based on mixed tungsten and molybdenum carbides.

SUMMARY OF THE INVENTION

The present invention relates to a process for reforming a hydrocarbon which comprises treating the hydrocarbon, while at elevated temperature, with a transition metal catalyst, while in the presence of an effective amount of gaseous oxygen to improve the selectivity of the catalyst to aromatic formation and reduce the hydrogenolysis activity of the catalyst. The transition metal may be tungsten, and the transition metal catalyst may be supported on an oxidic support, optionally with a ceramic passivation layer lying between the support and the transition metal catalyst. The amount of gaseous oxygen used may be from about 50 ppm to about 5000 ppm, based upon the weight of the hydrocarbon.

DESCRIPTION OF PREFERRED EMBODIMENTS

The present invention relates to the use of a combination of a particular type of catalyst in reforming a hydrocarbon feedstock in which a small amount of oxygen gas is present in the feedstock stream to improve the selectivity of the catalyst to aromatics and to reduce the hydrogenolysis activity of the catalyst.

The general type of reforming process to which the present invent is an improvement is well known to persons of ordinary skill in the art. In general, such a process involves the treatment of a hydrocarbon feedstock with hydrogen at hydrogen:hydrocarbon molar ratios of from about 3 to about 10 at preferred temperatures of from about 470° C. to about 530° C. using pressures of from about 10 atmospheres to about 50 atmospheres.

The type of catalyst used in the instant novel process is a transition metal carbide, such as one selected from Group VIB of the Periodic Table of the Elements, as exemplified by tungsten, which is preferred, or molybdenum, or mixed tungsten/molybdenum carbides.

The carbide catalyst phase can be advantageously formed by the calcination (e.g., 400° C. to 900° C.) of the selected transition metal salt, such as a halide, with an acyclic compound containing carbon-nitrogen-hydrogen bonding, such as guanidine, an adduct of guanidine, a deammoniated derivative of guanidine (e.g., cyanamide or dicyanimide), or an adduct of such a deammoniated derivative. Further details regarding such a synthetic approach are to be found in U.S. Ser. No. 878,726, filed May 4, 1992, now abandoned, which is incorporated herein in its entirety.

If desired, the transition metal carbide catalyst can be supported on a high surface area oxidic support such as silica, alumina, alumina-silica, titania, magnesia-alumina-silica, corderite, or a zeolite. Preferably, if such an oxidic support is chosen, a passivating layer of a ceramic such as silicon carbide or silicon nitride, will be placed intermediate the oxidic support and carbide component as more fully described in U.S. Ser. No. 984,129 filed Dec. 1, 1992, now U.S. Pat. No. 5,338,716, which is incorporated herein by reference.

The present invention is more fully understood by reference to the Examples which follow.

EXAMPLE 1

This Example illustrates preparation of an oxidic support for the catalyst used in the Examples which follow.

Boehmite alumina was extruded into 1/32 inch cylinders and calcined at 950° C. This alumina was used as the support for Examples 2–4. Its surface area was 155 $m^2$/gm and its pore volume was 0.72 cc/gm.

EXAMPLE 2

In this Example the alumina support from Example 1 was coated with a passivating layer of silicon carbide.

Alumina extrudates (100 gm) from Example 1 were mixed with 100 gm of a solution made by dissolving 15 gm of polycarbosilane (from Nippon Carbon Company, Ltd.) in 85 gm of heptane. The polycarbosilane solution was just enough to completely wet the alumina. The wet alumina extrudates were dried at 150° C. for thirty minutes and were then calcined under nitrogen at 1100° C. for two hours. Upon cooling, the extrudates appeared black throughout. The weight of the product was 28.3 gm. The calculated weight for alumina plus silicon carbide was 28.2 gm.

EXAMPLE 3

In this Example, the silicon carbide-coated alumina from Example 2 was coated with a second coating of tungsten carbide to form the catalyst used in the reforming experiments reported in the Examples which follow.

One hundred forty grams of the product prepared according to Example 2 was admixed with 120 gm of tungsten hexachloride and 86 gm of guanidine hydrochloride and heated at about 350° C. in a round bottom flask with mixing until most of the hydrogen chloride was evolved and white fumes of ammonium chloride started to appear. The material was then calcined at 775° C. for two hours under nitrogen. The XRD showed that the catalyst contains $W_2(C,O)$. Surface area by BET method showed 140 $m^2$/gm.

COMPARATIVE EXAMPLE 4

This Example illustrates a reforming procedure not in accordance with the present invention in which no oxygen activation of the carbide catalyst is used.

Three grams of the catalyst prepared in Example 3 was placed in a one inch diameter reactor and activated with a hydrogen gas stream at a flow rate of 10 cc per minute at 500° C. for sixteen hours. Hydrogen was then passed through a reservoir of n-heptane maintained at room temperature prior to passing over the catalyst. The heptane-saturated hydrogen was passed over the catalyst for a period of eight hours. Analysis of the effluent gases after eight hours was performed by a gas chromatograph calibrated for aromatics, hydrocarbons and isomers as the products of the reforming reaction. The aromatic fraction comprised mainly toluene with a minor amount of benzene. These two products are deemed to be a measure of the performance of the catalyst for reforming a normal alkane chain of seven carbons to cyclic aromatics. The hydrocarbons that were produced were methane, ethane, propane, isobutane, n-butane, isopentane, n-pentane, and n-hexane. The isomers that were produced comprised the dimethylpentanes and methylhexanes. Both the hydrocarbons and isomers thus produced are by-products of the reforming reaction and are not the desired end-products. The results that were obtained, as shown in the Table given below, show that the concentration of aromatics in the product reached a steady state of about 48% after seventeen hours on stream:

| Time of Stream (Hrs) | Conversion To n-Heptane (%) | Selectivity | | |
|---|---|---|---|---|
| | | Aromatics (%) | Hydro-carbons (%) | Isomers (%) |
| 8 | 74 | 42 | 50 | 8 |
| 15 | 71 | 47 | 40 | 8 |
| 16 | 71 | 47 | 39 | 11 |
| 17 | 72 | 48 | 39 | 10 |

This Example illustrates the high concentration of the undesirable hydrocarbons resulting from cracking, a reaction not intended for the above conditions, when no oxygen gas is included in the hydrocarbon feedstock in accordance with the present invention.

COMPARATIVE EXAMPLE 5

This Example is presented for comparative purposes also and shows the results that are obtained when the carbide catalyst itself is treated with oxygen.

This Example illustrates that interruption of the process shown in Comparative Example 4 with treatment of the catalyst with a 5 cc/minute stream of 0.5% oxygen in nitrogen at 500° C. for sixteen hours to treat the catalyst with 5000 ppm of oxygen, followed by either reactivation with hydrogen in accordance with the prior art or without reactivation with hydrogen. The oxygen-treated catalyst was then retested with a n-heptane/hydrogen feed mixture in a reforming reaction. No significant change in selectivity was observed as compared to Comparative Example 4:

| Time of Stream (Hrs) | Conversion To n-Heptane (%) | Selectivity | | |
|---|---|---|---|---|
| | | Aromatics (%) | Hydro-carbons (%) | Isomers (%) |
| 18 | 33 | 36 | 50 | 11 |
| 19 | 41 | 42 | 45 | 10 |
| 20 | 38 | 41 | 44 | 10 |
| 23 | 34 | 50 | 43 | 7 |
| 24 | 37 | 52 | 40 | 6 |

EXAMPLE 6

This Example illustrates the present invention wherein the n-heptane/hydrogen feedstock used in Comparative Examples 4 and 5 is thereafter mixed with gaseous oxygen during the reforming reaction.

The feedstock was supplied at 10 cc per minute to the same catalyst under the same reactor conditions used in Comparative Examples 4 and 5 as a continuation of these runs. The feedstock was, however, mixed with nitrogen gas flowing at 5 cc per minute containing 0.5% oxygen to give a final oxygen concentration of 1666 ppm. A marked improvement in selectivity to aromatics (about 80%) was observed coupled with a marked decrease (to about 20%) of cracking to hydrocarbon by-products as the reforming reaction was continued. Furthermore, the performance of the catalyst was steady over longer periods of time as evidenced by the constant concentration of aromatics between forty and fifty-two hours on stream:

| Time of Stream (Hrs) | Conversion To n-Heptane (%) | Selectivity | | |
|---|---|---|---|---|
| | | Aromatics (%) | Hydro-carbons (%) | Isomers (%) |
| 25 | 33 | 60 | 40 | 0 |
| 26 | 30 | 65 | 35 | 0 |
| 28 | 46 | 71 | 29 | 0 |
| 32 | 49 | 77 | 23 | 0 |
| 36 | 52 | 78 | 22 | 0 |
| 40 | 54 | 79 | 21 | 0 |
| 44 | 56 | 80 | 20 | 0 |
| 47 | 56 | 81 | 19 | 0 |
| 50 | 57 | 81 | 19 | 0 |
| 52 | 59 | 80 | 20 | 0 |

The foregoing Examples should not be construed in a limiting sense since they are intended to merely show certain embodiments of the invention. The scope of protection sought is set forth in the claims which follow.

I claim:

1. A process for reforming a hydrocarbon which comprises treating the hydrocarbon, while at elevated temperature, with hydrogen while in the presence of a transition metal carbide catalyst and an effective amount of gaseous oxygen to improve the selectivity of the catalyst to aromatic formation and reduce the hydrogenolysis activity of the catalyst.

2. A process as claimed in claim 1 wherein the transition metal is tungsten.

3. A process as claimed in claim 1 wherein the transition metal carbide catalyst is supported on an oxidic support.

4. A process as claimed in claim 1 wherein the transition metal is tungsten and the transition metal carbide catalyst is supported on an oxidic support.

5. A process as claimed in claim 3 wherein a ceramic passivation layer selected from the group consisting of silicon nitride and silicon carbide lies between the support and the transition metal carbide catalyst.

6. A process as claimed in claim 4 wherein a ceramic passivation layer selected from the group consisting of silicon nitride and silicon carbide lies between the support and the transition metal carbide catalyst.

7. A process as claimed in claim 1 wherein the amount of gaseous oxygen is from about 50 ppm to about 5000 ppm, based upon the weight of the hydrocarbon.

8. A process as claimed in claim 2 wherein the amount of gaseous oxygen is from about 50 ppm to about 5000 ppm, based upon the weight of the hydrocarbon.

9. A process as claimed in claim 3 wherein the amount of gaseous oxygen is from about 50 ppm to about 5000 ppm, based upon the weight of the hydrocarbon.

10. A process as claimed in claim 4 wherein the amount of gaseous oxygen is from about 50 ppm to about 5000 ppm, based upon the weight of the hydrocarbon.

11. A process as claimed in claim 5 wherein the amount of gaseous oxygen is from about 50 ppm to about 5000 ppm, based upon the weight of the hydrocarbon.

12. A process as claimed in claim 6 wherein the amount of gaseous oxygen is from about 50 ppm to about 5000 ppm, based upon the weight of the hydrocarbon.

* * * * *